US011023410B2

(12) United States Patent
Roberts et al.

(10) Patent No.: US 11,023,410 B2
(45) Date of Patent: Jun. 1, 2021

(54) INSTRUCTIONS FOR PERFORMING MULTI-LINE MEMORY ACCESSES

(71) Applicant: Advanced Micro Devices, Inc., Santa Clara, CA (US)

(72) Inventors: David A. Roberts, Wellesley, MA (US); Shenghsun Cho, Stonybrook, NY (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 94 days.

(21) Appl. No.: 16/127,607

(22) Filed: Sep. 11, 2018

(65) Prior Publication Data
US 2020/0081864 A1    Mar. 12, 2020

(51) Int. Cl.
G06F 15/173    (2006.01)
G06F 13/16     (2006.01)
G06F 13/40     (2006.01)
G06F 12/0862   (2016.01)

(52) U.S. Cl.
CPC .... *G06F 15/17331* (2013.01); *G06F 12/0862* (2013.01); *G06F 13/1673* (2013.01); *G06F 13/4027* (2013.01); *G06F 2212/1021* (2013.01); *G06F 2212/1024* (2013.01); *G06F 2212/6026* (2013.01)

(58) Field of Classification Search
None
See application file for complete search history.

(56) References Cited

U.S. PATENT DOCUMENTS

| | | | |
|---|---|---|---|
| 9,286,261 B1 * | 3/2016 | Tzelnic | G06F 16/1847 |
| 9,612,972 B2 | 4/2017 | Roberts et al. | |
| 9,652,568 B1 * | 5/2017 | Tzelnic | G06F 17/5022 |
| 2008/0196034 A1 * | 8/2008 | Ajanovic | G06F 1/3203 718/103 |
| 2008/0301256 A1 * | 12/2008 | McWilliams | G06F 12/0284 709/214 |
| 2010/0049821 A1 * | 2/2010 | Oved | G06F 9/542 709/212 |

(Continued)

OTHER PUBLICATIONS

Degomme A., et al., "Simulating MPI Applications: the SMPI approach," IEEE Transactions on Parallel and Distributed Systems, Feb. 2017.

(Continued)

*Primary Examiner* — Henry Tsai
*Assistant Examiner* — Christopher A Bartels
(74) *Attorney, Agent, or Firm* — Park, Vaughan, Fleming & Dowler LLP

(57) ABSTRACT

A system is described that performs memory access operations. The system includes a processor in a first node, a memory in a second node, a communication interconnect coupled to the processor and the memory, and an interconnect controller in the first node coupled between the processor and the communication interconnect. Upon executing a multi-line memory access instruction, the processor prepares a memory access operation for accessing, in the memory, a block of data including at least some of each of at least two lines of data. The processor then causes the interconnect controller to use a single remote direct memory access memory transfer to perform the memory access operation for the block of data via the communication interconnect.

23 Claims, 7 Drawing Sheets

(56) References Cited

U.S. PATENT DOCUMENTS

| | | | |
|---|---|---|---|
| 2013/0097380 A1* | 4/2013 | Colgrove | G06F 3/0608 |
| | | | 711/118 |
| 2015/0242324 A1* | 8/2015 | Novakovic | G06F 12/0813 |
| | | | 711/121 |
| 2016/0077761 A1* | 3/2016 | Stabrawa | G06F 3/067 |
| | | | 711/172 |
| 2016/0103783 A1* | 4/2016 | Allen | H04L 67/104 |
| | | | 709/212 |
| 2016/0283127 A1* | 9/2016 | Stabrawa | G06F 12/08 |
| 2017/0149920 A1* | 5/2017 | Sammatshetti | G06F 13/4282 |
| 2019/0164598 A1* | 5/2019 | Shukla | G06F 3/0679 |

OTHER PUBLICATIONS

Intel, "Write Combining Memory Implementation Guidelines," Nov. 1998.

* cited by examiner

MULTI-LINE MEMORY
ACCESS INSTRUCTION
300

| OPCODE 302 | ADDR 304 | SIZE 306 | STRIDE 308 | COUNTER 310 | FLAG 312 |

FIG. 3

MULTI-LINE MEMORY
ACCESS INSTRUCTION
400

| OPCODE 402 | ADDR 404 | SIZE 406 | POINTER LIST 408 | COUNTER 410 | FLAG 412 |

FIG. 4

MULTI-LINE MEMORY
ACCESS INSTRUCTION
500

| OPCODE 502 | ADDR 504 | SIZE 506 | PTRS TO PTRS 508 | COUNTER 510 | FLAG 512 |

FIG. 5

INSTRUCTIONS FOR PERFORMING MULTI-LINE MEMORY ACCESSES

GOVERNMENT RIGHTS

This invention was made with government support under the PathForward Projected with Lawrence Livermore National Security (prime contract no. DE-AC52-07NA27344, subcontract no. B620717) awarded by the Department of Energy (DOE). The government has certain rights in this invention.

BACKGROUND

Related Art

Virtually all modern processors (e.g., microprocessors, etc.) are communicatively coupled to memories such as a dynamic random access (DRAM) memories, e.g., "main memories," that are used for storing data used by the processors for performing computational operations, control operations, etc. Processors perform memory access operations such as reads/loads for acquiring data from memory and writes/stores for storing data to memory. Given the large amounts of data that are accessed by the processors, the amount and arrangement of memories and mechanisms for accessing the memories are important concerns.

Some systems include multiple processors, each processor having or being associated with a separate local memory. For example, some systems include two or more nodes (e.g., sockets on a motherboard, individual server chassis, etc.) and each node includes at least one processor and an associated local memory. In some of these systems, the separate memories in the nodes are shared between the processors via an interconnect or link such as Gen-Z®, PCI-Express®, CCIX®, OpenCAPI®, Ethernet, etc., and thus the separate memories are logically combined to form an aggregate pool of memory that is accessible by all of the processors. For example, in a system with four nodes, each having a processor and a 4 GB local memory, the total shared pool of memory is 16 GB. In such systems, each processor is provided with two mechanisms for accessing memories, or "remote memories," in other nodes. The first mechanism involves using ordinary processor memory access instructions (e.g., load instructions, store instructions, etc.) that are directed to addresses in remote memories to generate remote direct memory access (RDMA) operations for accessing individual lines of data (e.g., 64 byte cache lines or other main memory/cache-transaction sized lines, such as a 32-128 byte transaction size) in the remote memories. Although the first mechanism is efficient in terms of execution time and overhead for accessing individual lines of data in remote memories, in order to access multiple lines of data, multiple memory access instructions must be executed—and multiple corresponding RDMA operations, with the associated network traffic and management overhead, must be performed. Using the first mechanism for transfers larger than one or two lines is therefore inefficient. The second mechanism involves performing a direct memory access (DMA), for which a DMA "engine," or dedicated memory transfer functional block, is configured by a processor to perform a transfer of one or more lines of data from a remote memory to a local memory for the processor or vice versa. Although DMA can be used to transfer multiple lines of data, DMA requires that a processor perform a number of configuration operations to set up and manage the transfer. This means that DMA operations are inefficient for transfers of smaller numbers of lines, because the configuration and management overhead are large in proportion to the smaller number of lines to be transferred.

BRIEF DESCRIPTION OF THE FIGURES

FIG. 3 presents a block diagram illustrating a format for a multi-line memory access instruction in accordance with some embodiments.

FIG. 4 presents a block diagram illustrating a format for a multi-line memory access instruction in accordance with some embodiments.

FIG. 5 presents a block diagram illustrating a format for a multi-line memory access instruction in accordance with some embodiments.

Throughout the figures and the description, like reference numerals refer to the same figure elements.

DETAILED DESCRIPTION

Figure 1:
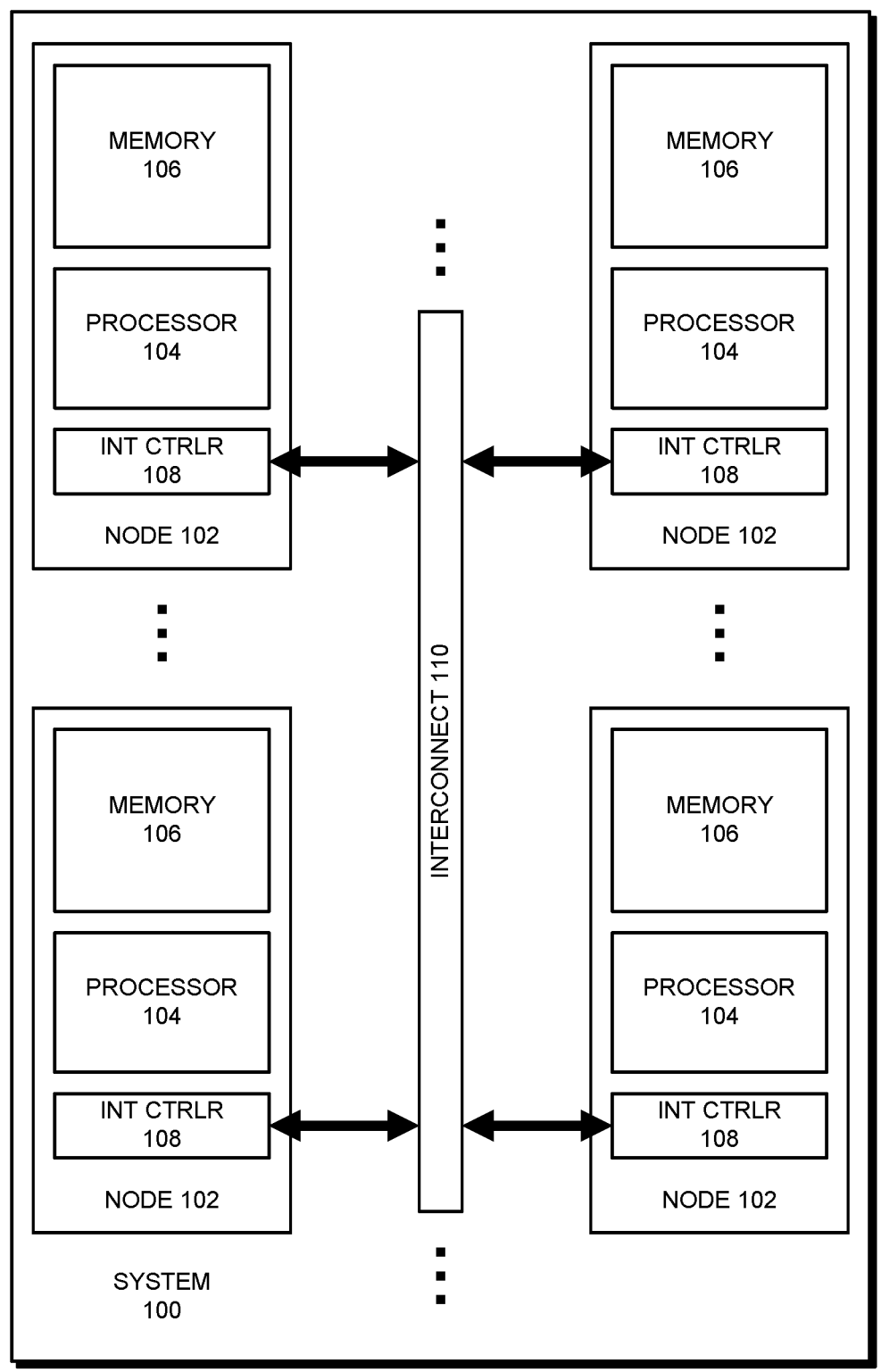
FIG. 1 presents a block diagram illustrating a system in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following are simplified and general descriptions of two of these terms. Note that the terms may have significant additional aspects that are not recited herein for clarity and brevity and thus the description is not intended to limit the terms.

Functional block: functional block refers to a group, collection, and/or set of one or more interrelated circuit elements such as integrated circuit elements, discrete circuit elements, etc. The circuit elements are "interrelated" in that circuit elements share at least one property. For instance, the interrelated circuit elements may be included in, fabricated on, or otherwise coupled to a particular integrated circuit chip or portion thereof, may be involved in the performance of given functions (computational or processing functions, memory functions, etc.), may be controlled by a common control element, etc. A functional block can include any number of circuit elements, from a single circuit element (e.g., a single integrated circuit logic gate) to millions or billions of circuit elements (e.g., an integrated circuit memory).

Lines: a line or "line of data" refers to a block or portion of memory having a specified size that can be accessed (i.e., read/loaded, written/stored to, etc.) by processors and/or other entities in a system. The size of a line is not fixed and therefore may be different for different implementations (i.e., architectures, operating systems, processors, bus widths, cache or memory specifications, etc.). For example, in some embodiments, the size of a line is equal to a size of a cache line, i.e., a number of bytes of data (64 bytes, 128 bytes, etc.) that is used for performing operations in a cache memory. As another example, in some embodiments, the size of a line is equal to a memory transaction size (e.g., 32-128 bytes). When a line of data is read/loaded from a memory, a corresponding number of bytes is acquired from the memory and then communicated from the memory to a reading/loading entity, possibly in several read sub-operations, each read sub-operation including a separate transmission of data across a communication interface (e.g., bus, interconnect, network, etc.). For example, given a bus on which 64 bits can be transferred in parallel per cycle, a 64 byte line is read using eight read sub-operations in eight cycles. A similar set of operations is performed, albeit in reverse, for writing/storing a line of data in a memory. As used herein, "some" of a line, or line of data, includes a portion of the line of data, but not all of the line of data, such as four bytes of an eight byte line, one half of a five byte line, etc.

Overview

The described embodiments include a system having one or more processors (e.g., microprocessors, etc.) and corresponding memories (e.g., dynamic random access memories (DRAMs), non-volatile random access memories (NVRAMs), etc.) in, or associated with, one or more nodes. For example, the nodes may include two or more sockets or other physical or logical subsections of a circuit board (e.g., a motherboard, etc.), each socket/subsection having a processor and a memory mounted, connected, and/or coupled thereto. As another example, the nodes may include two or more sever chassis, each server chassis including at least one processor and a corresponding memory. An instruction set of the processors includes multi-line memory access instructions that, when executed by the processor, cause the processor to perform memory access operations during which a block of data that includes at least some of each of two lines of data is accessed (i.e., read or written) using a single memory transfer. For example, each line of data may be the size of an N byte cache line (where N=32, 64, etc.) and thus some or all of the bytes in two or more N-byte portions of memory are accessed upon executing a multi-line memory access instruction.

In some embodiments, the multi-line memory access instructions include a multi-line memory read instruction for reading data from memory. In these embodiments, the multi-line memory read instruction causes the processor to generate a single memory transfer for acquiring, from a memory, a block of data that includes at least some of each of two lines that are to be stored in a memory and/or a cache in the processor. In some embodiments, when executed, the multi-line memory read instruction causes a data prefetcher in the processor to generate, based on information from the multi-line memory read instruction, a data prefetch request for the at least some of each of the at least two lines of data. For example, the multi-line memory read instruction may include information about or for computing addresses of and amounts of data in each of the two or more lines that is to be combined into a block of data to be acquired in the single memory transfer. When the multi-line memory read instruction specifies a remote memory (i.e., a memory in a node other than the node in which the processor is located), the data prefetch request is forwarded from the data prefetcher to an interconnect controller (directly or via one or more other functional blocks), which generates a single remote direct memory access (RDMA) request for acquiring the block of data. When the multi-line memory read instruction specifies a local memory (i.e., a memory in the node in which the processor is located), the data prefetch request is forwarded from the data prefetcher to a memory controller in the processor (directly or via one or more other functional blocks) to be handled as an ordinary memory read, albeit for the entire block of data in a single memory transfer.

In some embodiments, the multi-line memory access instructions include a multi-line memory write instruction for storing data in memory. In these embodiments, the multi-line memory write instruction causes the processor to generate a single memory transfer for sending, to memory, a block of data that includes at least some of each of two lines that are to be stored in the memory. In some embodiments, the particular mechanism by which the multi-line memory write instruction is handled depends on elements present in the processor and/or the configuration of the corresponding memory. For example, in some embodiments, the memory or a portion thereof (e.g., particular M-byte pages of memory) is "cacheable," meaning that the corresponding data is initially stored in a cache in or associated with the processor and then eventually stored in memory as needed (which can be called "write back" memory). As another example, in some embodiments, the memory or a portion thereof is "write combining," meaning that individual writes directed to the memory or portions thereof (of specified bytes of data) are combined, to at least some extent, in a write combining buffer (WCB) before being sent to the memory as a group. An overview of the handling of the multi-line memory write instructions in view of the two different configurations of the memory is presented below.

In some embodiments, when writing data to a portion of the memory that is cacheable, the multi-line memory write instruction causes the processor to send information from the multi-line memory write instruction to a cache controller. Prior to sending the information, at least some of each of at least two lines of data are stored in respective lines of a cache that is controlled by the cache controller. Based on information from the multi-line memory write instruction, the cache controller generates a flush request to flush (i.e., evict or otherwise write back) the at least some of each of the at least two lines of data from the respective lines of the cache. For example, the multi-line memory write instruction may include information about or for computing addresses of and amounts of data in each of the two or more lines that are to be flushed from the cache. When the multi-line memory write instruction specifies a remote memory, an interconnect controller then generates, based on information in the flush request and/or the multi-line memory write instruction, a remote direct memory access (RDMA) request for storing a block of data generated from the flush from the cache in the remote memory in a single memory transfer. When the multi-line memory write instruction specifies a local memory, a memory controller in the processor, based on information from the multi-line memory write instruction, handles the write instruction as an ordinary memory write, albeit for an entire block of block of data generated from the flush from the cache in a single memory transfer.

In some embodiments, when writing data to a portion of the memory that is write combining, the multi-line memory write instruction causes the processor to send a write combination barrier to a write combining buffer (WCB) controller. Prior to sending the write combination barrier, at least some of each of at least two lines of data are stored in the WCB. The write combination barrier causes the WCB controller to substantially immediately write back the data from the some or all of the at least two lines of data in the WCB. When the multi-line memory write instruction specifies a remote memory, an interconnect controller generates, based on information in the write combination barrier or the multi-line memory write instruction, a remote direct memory access (RDMA) request for storing a block of data generated from the data from the some or all of the at least two lines of data written back from the WCB in the remote memory in a single memory transfer. When the multi-line memory write instruction specifies a local memory, a memory controller in the processor, based on information from the multi-line memory write instruction, handles the write instruction as an ordinary memory write, albeit for an entire block of data generated from the data from the some or all of the at least two lines of data written back from the WCB in a single memory transfer.

In some embodiments, the above-described multi-line memory write instructions include a write-chaining flag that can be asserted (e.g., set to a value such as 1) or deasserted (e.g., set to a value such as 0). When the write-chaining flag is asserted, the WCB controller determines that at least some of each of at least two lines of data indicated in the multi-line memory write instruction are to be combined with any existing lines of data in the buffer from prior multi-line memory write instructions for which the write-chaining flags were asserted, but are to be otherwise held in the WCB—and not substantially immediately written back to memory. When the write-chaining flag is deasserted, the WCB controller determines that at least some of each of at least two lines of data indicated in the multi-line memory write instruction are to be combined in a block of data with any existing lines of data in the buffer from prior multi-line memory write instructions for which the write-chaining flags were asserted and the block of data is to be written back to (a local or remote) memory in a single memory transfer as described above.

As described above, depending on the embodiment and the particular memory access instruction, specified entities (e.g., a cache controller, an interconnect controller, etc.) perform various operations for accessing data in memory "based on information from" the multi-line memory access instructions and the multi-line memory access instruction "may include information about or for computing addresses and amounts of data in each of the two or more lines" that are to be accessed. In some embodiments, the information from the multi-line memory access instructions includes information such as a base or starting address, a stride, a data size, one or more pointers, a count, etc. that can be used alone or in combination with other data (e.g., an absolute base address, one or more offset values, etc.) to compute memory addresses, memory address ranges, data sizes (e.g., number of bytes), etc. for the described operations.

By using the above-described multi-line memory access instructions, a processor can access blocks of data including some or all of each of at least two lines of data using mechanisms within the processor. This means that the processor can perform memory accesses for blocks of data including data from more than one line of data without relying on mechanisms such as an external direct memory access (DMA) mechanisms, which require a number of operations to prepare and configure. In addition, the processor need not perform multiple separate single-line transfers, with the attendant overhead, for accessing multiple lines of data. The processor therefore performs memory access operations for blocks of data that include data from each of two or more lines more efficiently and quickly than existing processors. Because memory accesses are typically a performance bottleneck, improving the efficiency and speed of performing memory accesses improves the overall performance of the processor and the nodes and systems in which the processor is included.

System

FIG. 1 presents a block diagram illustrating system 100 in accordance with some embodiments. As can be seen in FIG. 1, system 100 includes a number of nodes 102 communicatively coupled to an interconnect 110. Each node 102 is a set, group, or collection of functional blocks, devices, parts, and/or circuit elements that perform computational, memory, and/or communication operations. For example, in some embodiments, some or all of the nodes 102 include a socket, holder, or other mounting device to which is coupled (i.e., plugged, held, mounted, etc.) one or more semiconductor integrated circuit chips having integrated circuits for the functional blocks, devices, parts, etc., such as a set of sockets on one or more motherboards, circuit boards, interposers, etc. As another example, in some embodiments, some or all of the nodes 102 include a chassis or housing such as a server chassis or computing device housing in which the functional blocks, devices, parts, etc. are included. Generally, each node 102 is a physical or logical grouping of functional blocks, devices, parts, etc. that can perform the operations herein described.

As can be seen in FIG. 1, each node 102 includes a processor 104, a memory 106, and an interconnect controller (INT CTRLR) 108. Generally, processor 104, memory 106, and interconnect controller 108 are implemented in hardware, i.e., using various circuit elements and devices. For example, processor 104, memory 106, and interconnect controller 108 can be entirely fabricated on one or more semiconductor chips, including on one or more separate semiconductor chips, can be fashioned from semiconductor chips in combination with discrete circuit elements, can be fabricated from discrete circuit elements alone, etc. As described herein, processor 104, memory 106, and interconnect controller 108 perform operations relating to memory accesses (i.e., reads/loads and writes/stores) as dictated or caused by executing multi-line memory access instructions.

In each node 102, the processor 104 is a functional block that performs computational, memory access, and other operations (e.g., control operations, configuration operations, etc.). For example, processor 104 can be or include one or more microprocessors, central processing unit (CPU)

cores, and/or another processing mechanism. An embodiment of a processor 104 is described in more detail below.

In each node 102, the memory 106 is a functional block that performs operations of a memory (e.g., a "main" memory) for the node 102. Memory 106 includes volatile and/or non-volatile memory circuits such as fourth-generation double data rate synchronous DRAM (DDR4 SDRAM) and/or other types of memory circuits for storing data and instructions for use by functional blocks in the node 102 and control circuits for handling accesses of the data and instructions that are stored in the memory circuits and for performing other control or configuration operations.

In some embodiments, the memory 106 in each node 102 is shared by and therefore available for accesses by functional blocks in other nodes 102. For example, in some embodiments, an overall memory of system 100, which is accessible by the processors 104 in all nodes 102, includes the individual memories 106 in each node so that a total capacity of memory (in terms of bytes) in system 100 is equal to a sum of the capacity of the memory in each node. In these embodiments, memory in each node can be assigned a separate portion of a range of addresses for the full memory, so that a memory in a first node includes memory in the address range 0-M, a second node includes memory in the address range M+1-K, etc., where M and K are address values and M<K. As described herein, an instruction set of the processors/system 100 includes instructions for performing multi-line memory accesses both in a local memory 106 in a processor 104's node 102 and in remote memories 106 in other nodes 102.

In each node 102, interconnect controller 108 is a functional block that performs operations for communicating on interconnect 110 in accordance with a communication protocol in use on interconnect 110 (e.g., Gen-Z®, PCI-Express®, CCIX®, OpenCAPI®, Ethernet, etc.). For example, in some embodiments, upon receiving a request from processor 104 to transmit/send specified data to one or more interconnect controllers 108 (or other destination entities) in other nodes, interconnect controller 108 generates packets, protocol data units, streams, messages or requests, etc. that include the data and/or other data-related information and then transmits/sends the packets, protocol data units, etc. to the one or more other interconnect controllers 108 via interconnect 110. As another example, in some embodiments, upon receiving a request from processor 104 to receive/acquire specified data from one or more interconnect controllers 108 in other nodes (or from other source entities, such as a memory 106, a processor 104, etc.), interconnect controller 108 generates packets, protocol data units, streams, messages or requests, etc. that request the data, transmits/sends the packets, protocol data units, etc. to the one or more other interconnect controllers 108 via interconnect 110, and awaits the return of data from the one or more other interconnect controllers via interconnect 110. In some embodiments, interconnect controller 108 performs operations for acquiring or receiving data from entities in addition to memory 106 such as caches, write combination buffers (WCB), etc., generating packets therefrom, and transmitting the packets to receiving interconnect controllers 108 in destination nodes 102.

Interconnect 110 is a functional block that performs operations for communicating data and information on one or more buses or other communication channels. Interconnect 110 includes or is coupled to wires, guides, traces, wireless communication channels, transceivers, control circuits, antennas, etc., that are used for communicating the data and information. Communication is performed on interconnect 110 (and functional blocks such as interconnect controllers 108) in accordance with and using a specified protocol, such as Gen-Z®, PCI-Express®, CCIX®, OpenCAPI®, etc. In some embodiments, when accessing a remote memory in another node, a processor in a given node, via a corresponding interconnect controller 108, accesses the remote memory via interconnect 110.

System 100 is simplified for illustrative purposes. In some embodiments, however, system 100 and/or nodes 102 include additional or different functional blocks, subsystems, elements, and/or communication paths. For example, system 100 and/or nodes 102 may include display subsystems, power subsystems, input-output (I/O) subsystems, etc. System 100 and/or nodes 102 generally include sufficient functional blocks, etc. to perform the operations herein described. In addition, although four nodes are shown in FIG. 1, in some embodiments, a different number of nodes is present—as shown by the ellipses in FIG. 1.

System 100 and/or nodes 102 can be, or can be included in, any device that performs computational operations. For example, system 100 and/or one or more nodes 102 can be, or can be included in, a desktop computer, a laptop computer, a wearable computing device, a tablet computer, a piece of virtual or augmented reality equipment, a smart phone, an artificial intelligence (AI) or machine learning device, a server, a network appliance, a toy, a piece of audio-visual equipment, a home appliance, a vehicle, etc., and/or combinations thereof. In some embodiments, system 100 is a motherboard or other circuit board to which multiple nodes 102 are mounted or connected, and interconnect 110 is an inter-node communication route. In some embodiments, system 100 includes a set or group of computers (e.g., a group of server computers, etc.), one computer per node, the computers being coupled together via a wired or wireless inter-computer interconnect 110.

Processor

Figure 2:
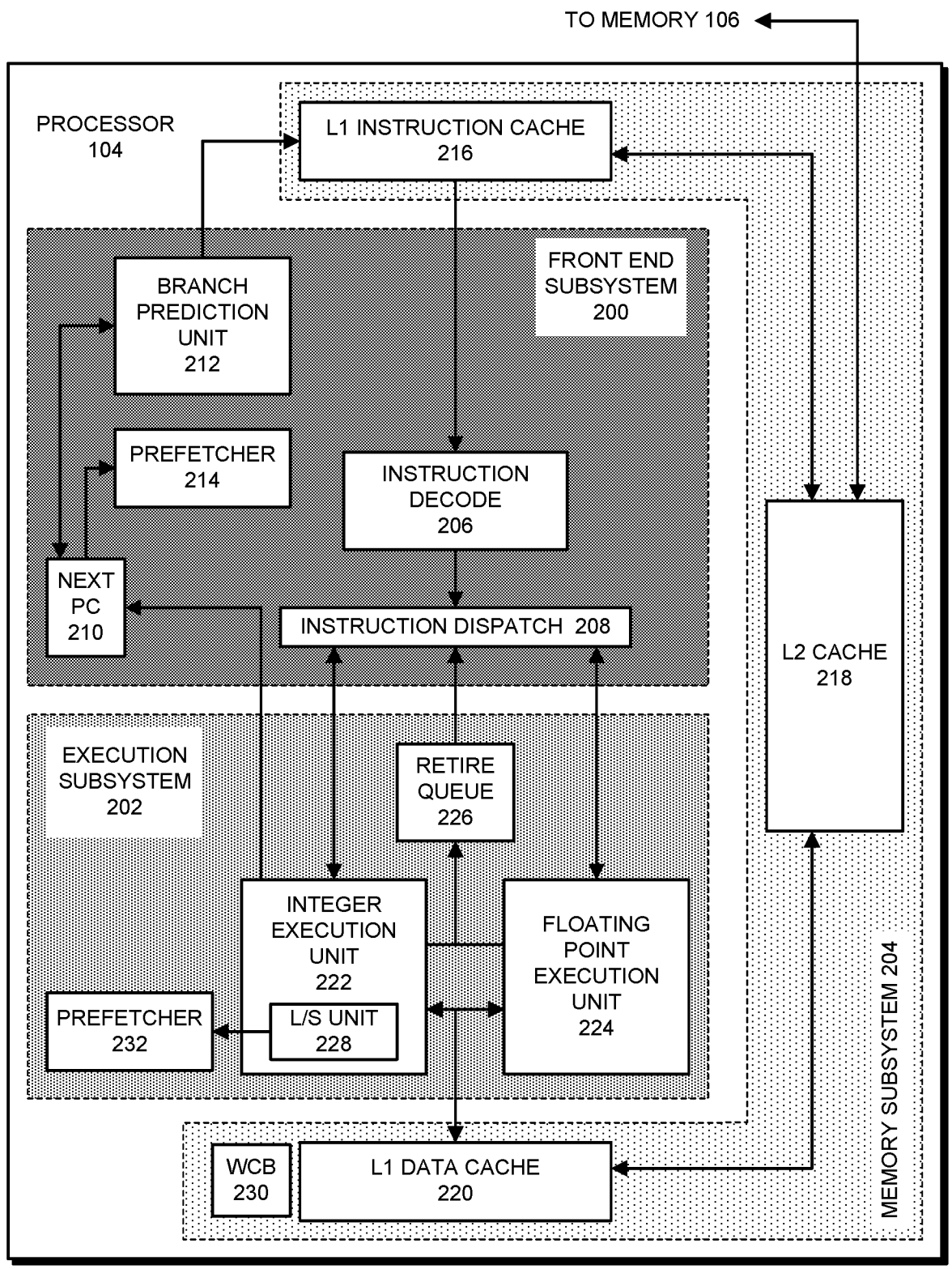
FIG. 2 presents a block diagram illustrating a processor in accordance with some embodiments.

As described above, each node 102 in system 100 includes a processor 104, which can be a microprocessor, a CPU core, and/or another processing mechanism. FIG. 2 presents a block diagram illustrating a processor 104 in accordance with some embodiments. Although certain functional blocks are shown in FIG. 2, in some embodiments, different arrangements, connectivity, numbers, and/or types of functional blocks may be present in processor 104. Generally, processor 104 includes sufficient functional blocks to perform the operations described herein.

As can be seen in FIG. 2, the functional blocks in processor 104 can be considered as part of a front end subsystem 200, an execution subsystem 202, or a memory subsystem 204. Front end subsystem 200 includes functional blocks that perform operations for acquiring instructions from cache memories or main memory in, or in communication with, memory subsystem 204 and prepare the instructions for dispatch to execution unit functional blocks in execution subsystem 202. The execution unit functional blocks in execution subsystem 202, possibly using data acquired from the cache memories or the main memory in, or in communication with, memory subsystem 204, generate results, perform operations, and/or cause other functional blocks to perform operations when executing the instructions and forward results, if any, to the memory subsystem 204 for storage therein.

Front end subsystem 200 includes instruction decode 206, which is a functional block that performs operations relating to the decoding and preparation for execution of fetched instructions. Instruction decode 206 fetches or otherwise receives, from L1 instruction cache 216, L2 cache 218, L3 cache (not shown), or memory 106, instructions in N-byte fetch groups (e.g., four instructions in a 32-byte fetch group, etc.). Instruction decode 206 then, possibly in parallel, decodes the instructions in the fetch group into respective micro-operations and/or acquires cached micro-operations associated with the instructions. Instruction decode 206 next sends the micro-operations to instruction dispatch 208 to be forwarded to the appropriate execution unit in execution subsystem 202 for execution.

Front end subsystem 200 also includes next PC 210, which is a functional block that performs operations for determining a program counter, or address in memory, from which a next fetch group is to be fetched. Next PC 210, based on an initial or current value of the program counter, computes a next sequential value for the program counter. For example, given 32-byte fetch groups, next PC 210 may compute next address=current address+32 bytes. When control transfer instructions (CTIs) do not change program flow, front end subsystem 200 uses the sequential values of the program counter that are computed by next PC 210 for fetching fetch groups from corresponding sequential addresses in memory.

Front end subsystem 200 further includes branch prediction unit 212, which is a functional block that performs operations for predicting the resolutions of CTIs in fetch groups and modifying the program counter—and thus the address in memory from which subsequent fetch groups are fetched—accordingly. In other words, branch prediction unit 212, using one or more records of CTI behavior, predicts a "taken" or "not-taken" resolution of CTIs and provides a predicted target address for taken CTIs. When CTIs are predicted taken by branch prediction unit 212, a next or subsequent program counter provided by next PC 210 may be replaced using a target address returned by branch prediction unit 212.

Front end subsystem 200 further includes prefetcher 214, which is a functional block that performs operations for speculatively prefetching instructions that may be needed for subsequent execution. Prefetcher 214, based at least in part on a current program counter and one or more prefetch records that include indications of instructions that were previously executed, program counters used, etc. after the current program counter, speculatively fetches or otherwise receives, from L2 cache 218, an L3 cache, or memory 106, instructions that are projected to be needed, and stores the fetched instructions in L1 cache 216.

Execution subsystem 202 includes integer execution unit 222 and floating point execution unit 224 (collectively, "execution units"), which are functional blocks that perform operations for executing integer and floating point instructions, respectively. The execution units include elements such as renaming hardware, execution schedulers, arithmetic logic units (ALUs), floating point multiply and add units (in floating point execution unit 224), register files, etc. Integer execution unit 222 includes load/store (L/S) unit 228, which is a functional block that performs operations for loading/reading data into functional blocks in memory subsystem 204 (e.g., from memory 106 to one or more caches in memory subsystem 204, from remote memories to memory 106 and/or one or more caches in memory subsystem 204, etc.) and writing/storing data into the functional blocks in memory subsystem 204. In some embodiments, load/store unit 228 performs at least some of the operations associated with executing multi-line memory access instructions, such as preparing requests, causing other functional blocks to perform corresponding operations, etc.

Execution subsystem 202 also includes retire queue 226, which is a functional block in which the results of executed instructions are held after the corresponding instructions have completed execution, but prior to the results being committed to an architectural state of processor 104 (e.g., written to a cache or memory and made available for use in other operations). In some embodiments, certain instructions can be executed out of program order and retire queue 226 is used in ensuring that results of out-of-order instructions are retired properly with respect to other out-of-order instructions.

Execution subsystem 202 further includes prefetcher 232, which is a functional block that performs operations for speculatively prefetching data that may be needed for subsequent execution. Prefetcher 232, based at least in part on one or more addresses being accessed in load/store unit 228 and one or more prefetch records that include indications of previous data accesses, previous address accesses, etc., speculatively fetches or otherwise receives, from L2 cache 218, an L3 cache, or memory 106, data that is projected to be needed, and stores the fetched data in L1 data cache 220. Note that prefetcher 232 differs from prefetcher 214 in front end 202 in that prefetcher 232 speculatively prefetches data, while prefetcher 214 speculatively prefetches instructions.

In some embodiments, prefetcher 232 performs operations associated with multi-line memory access instructions. In some of these embodiments, when the multi-line memory access instruction is a read memory access instruction, the execution unit functional block (e.g., integer execution unit 222) may cause prefetcher 232 to generate, based on information from the multi-line memory access instruction, a data prefetch request for at least some of each of two or more lines of data. When the data is to be prefetched from a remote memory 106 in another node 102, prefetcher 232 (or another functional block in processor 104, such as a memory controller (not shown)) forwards the data prefetch request to interconnect controller 108 which generates, based on the prefetch request (and possibly information from the multi-line memory access instruction and/or elsewhere), a single remote direct memory access (RDMA) in order to perform an RDMA memory transfer to acquire a block of data that includes the at least some of each of the two or more lines of data via communication interconnect 110. When the data is to be prefetched from a local memory 106 in the same node 102, prefetcher 232 forwards the data prefetch request to the memory controller which performs, based on the prefetch request (and possibly information from the multi-line memory access instruction and/or elsewhere), a single memory transfer to acquire a block of data that includes the at least some of each of the two or more lines of data from a local memory 106 in the node. The acquired data is then stored in memory 106, L1 data cache 220, and/or L2 cache 218.

In some embodiments, data prefetcher 232 prevents some or all prefetches associated with or performed in response to executing multi-line memory access instructions from affecting the prefetch records. In other words, prefetcher 232 performs the prefetches as described above in response to executing multi-line memory access instructions, but does not update the prefetch records based on the prefetches associated with the multi-line memory access instructions. In these embodiments, the multi-line memory access instructions can include prefetches that are for accessing data that is only used once (e.g., for streaming data, checksum generation, etc.) and/or are otherwise for data should not be used to (subsequently) overwrite other data in memory, caches, etc., and thus prefetcher 232 does not update the prefetch records. This can help to avoid corrupting or distorting the prefetch records.

Memory subsystem 204 includes a hierarchy of caches, which are functional blocks that include volatile memory circuits configured for storing limited numbers of copies of instructions and/or data near the functional blocks that use the instructions and/or data, as well as control circuits for handling operations such as accesses of the data. The hierarchy includes two levels, with level one (L1) instruction cache 216 and L1 data cache 220 on the first level, and L2 cache 218 on the second level. Memory subsystem 204 is communicatively coupled to memory 106 and may be coupled to an external L3 cache (not shown). Memory 106 may be coupled to a non-volatile mass storage device that functions as long-term storage for instructions and/or data (e.g., a disk drive or solid state drive) (not shown).

In some embodiments, the caches in memory subsystem 204 each include a cache controller (not shown), which is a functional block that performs operations for controlling the operation of a corresponding cache. For example, a cache controller may perform operations for determining portions of the corresponding cache (e.g., one or more 64 byte cache lines) where incoming data is to be stored, acquiring and returning requested data in the corresponding cache for other functional blocks, evicting or flushing data from portions of the corresponding cache, managing data stored in the corresponding cache, etc.

In some embodiments, the cache controller for at least one of the caches in memory subsystem 204 performs operations associated with multi-line memory access instructions for portions of memory that are cacheable. In these embodiments, when the multi-line memory access instruction is a write memory access instruction, the execution unit functional block (e.g., the integer execution unit 222) first, based on information from the multi-line memory access instruction, stores data in at least some of each of two or more lines in the cache. The execution unit then causes the cache controller to generate, based on information from the multi-line memory access instruction, a flush request for the at least some of each of the two or more lines of data. When the data is to be written to/stored in a remote memory 106 in another node 102, the cache controller forwards the flush request to interconnect controller 108 which generates, based on the flush request (and possibly information from the multi-line memory access instruction and/or elsewhere), a single remote direct memory access (RDMA) in order to perform an RDMA memory transfer to send a block of data that includes the at least some of each of the two or more lines of data to the remote memory 106 via communication interconnect 110 in a single memory transfer. When the data is to be written to/stored in a local memory 106 in the same node 102, the cache controller forwards the flush request to a memory controller which generates, based on the flush request (and possibly information from the multi-line memory access instruction and/or elsewhere), a memory transfer to send, in a single transfer, a block of data that includes the at least some of each of the two or more lines of data to a local memory 106 in the node for storage therein.

Memory subsystem 204 also includes write combining buffer 230, which is a functional block that performs operations relating to buffering (temporarily storing) and aggregating/combining data (i.e., one or more bytes) from two or more different memory write/store operations into a single combined block of data for storage. In some embodiments, writes of data to addresses within a range of addresses that can be simultaneously stored in a set of entries in write combining buffer 230 may be buffered in write combining buffer 230 (i.e., stored in write combining buffer 230 and not immediately sent to caches in memory subsystem 204 or memory 106) until write combining buffer 230 is full or another condition is met (e.g., timeout, subsequent writes that cannot be stored in write combining buffer 230, etc.). When write combining buffer 230 is full or the other condition is met, the data is then retrieved from write combining buffer 230 and written to memory.

In some embodiments, write combining buffer 230 performs operations associated with multi-line memory access instructions for portions of memory that are write combining. In these embodiments, when the multi-line memory access instruction is a write memory access instruction, the execution unit functional block (e.g., the integer execution unit 222) first stores data from at least some of each of two or more lines in write combining buffer 230. The execution unit then communicates, to a write combining buffer controller, a write combination barrier to cause the write combining buffer controller to substantially immediately write back the some of each of the two or more lines of data from write combining buffer 230. When the data is to be written to/stored in a remote memory 106 in another node 102, the write combining buffer controller forwards the write combination barrier to interconnect controller 108, which generates, based on information from the multi-line memory access instruction and/or elsewhere, a single remote direct memory access (RDMA) in order to perform an RDMA memory transfer to send a block of data that includes the at least some of each of the two or more lines of data to the remote memory 106 via communication interconnect 110. When the data is to be written to/stored in a local memory 106 in the same node 102, the write combining buffer controller forwards the write combination barrier to a memory controller (not shown) which generates, based on information from the multi-line memory access instruction and/or elsewhere, a single memory transfer to send a block of data that includes the at least some of each of the two or more lines of data to a local memory 106 in the node for storage therein. In some embodiments, the write combining buffer controller writes back only data from the at least some of each of the two or more lines and leaves other data in write combining buffer 230.

In some embodiments, the multi-line memory write instructions include a write-chaining flag. The write-chaining flag is used to indicate, to the execution unit and/or the write combining buffer controller, whether a write combination barrier should be immediately sent or the at least some of each of the at least two lines should be buffered along with any existing data from other multi-line memory write instructions in write combining buffer 230 without immediately sending the write combination barrier. In these embodiments, as long as the write-chaining flag is set/asserted in multi-line memory write instructions (and no other conditions cause the write back of data from write combining buffer 230), corresponding data is buffered in write combining buffer 230 and not immediately written back (no write combination barrier is asserted). When the write-chaining flag is not set in a multi-line memory write instruction, however, the write combination barrier is asserted and the data (i.e., at least the data in write combining buffer 230 from any multi-line memory write instructions) is written back to memory as described above. In this way, the execution unit and/or the write combining buffer controller can be caused to buffer write data, thereby increasing the size of the data payload that is eventually written back—which can help to avoid memory bus/communication interconnect traffic, control overhead, etc.

In some embodiments, the above-described multi-line memory write instructions, when executed, can cause the "writing" of data stored in a cache or a write combining buffer back to a memory. The term write, as used herein, therefore may be interpreted to mean "write back," in that data is written back to a memory as described from the various functional blocks.

Multi-Line Memory Access Instructions

In the described embodiments, an instruction set for processors includes multi-line memory access instructions. Generally, the multi-line memory access instructions cause a processor to access (i.e., read or write) at least some data in, and potentially all data in, each of multiple lines in a local or remote memory in a single memory transfer. FIGS. 3-5 present block diagrams illustrating formats for multi-line memory access instructions in accordance with some embodiments. Although instructions are shown in FIGS. 3-5 as having particular formats, i.e., including particular fields and information, in some embodiments, different formats, fields, and/or information is present in some or all of the multi-line memory access instructions. Generally, the described embodiments include sufficient instructions to enable a system to perform the operations herein described.

Although not shown in FIGS. 3-5, each of the multi-line memory access instructions could be either a multi-line memory read instruction or a multi-line memory write instruction, which may be indicated using separate opcodes or other information (not shown) in the respective multi-line memory access instruction. The instructions are presented in FIGS. 3-5, however, using the all-encompassing term "memory access," and not both memory read and memory write, for brevity and clarity.

The multi-line memory access instructions shown in each of FIGS. 3-5 include, as described, a number of fields, each field being a reserved location among a set of bits of the multi-line memory access instruction that includes a predetermined number of bits for holding corresponding values. The particular number of bits in each field and the overall number of bits in each multi-line memory access instruction are not fixed, but depend on the architecture of the processor that will execute the multi-line memory access instructions.

Multi-line memory access instruction 300 as shown in FIG. 3, includes opcode 302, which is a string, bit pattern, or other indicator that identifies the instruction as a multi-line memory access instruction. Functional blocks in processor 104 use opcode 302 to determine the type of instruction and thus the arrangement of fields and information in the instruction, the decoding and/or processing steps to be performed, etc. when decoding and/or executing the instruction.

Address (ADDR) 304 in multi-line memory access instruction 300 is an absolute or relative address indicating a location in memory from which the memory access is to start. In other words, address 304 is a base address for the particular access dictated by the remaining information in multi-line memory access instruction 300. In some embodiments in which virtual memory is used, address 304 is a virtual address and thus should be translated into a physical address in memory using a page table, a translation lookaside buffer, etc. when performing memory accesses.

Size 306 in multi-line memory access instruction 300 is an indication of a size in bytes, words, etc. of data to be accessed when performing the memory access. Size 306 can be a value that represents any size of data that is to be accessed from a single bit to multiple lines. For example, a two bit value in size may indicate predetermined sizes or proportions of lines, such as 11 for a full line, 10 for half a line, 01 for one quarter of a line, and 00 for one eighth of a line.

Stride 308 in multi-line memory access instruction 300 is an indication of a stride, step, or interval in memory to be used when performing the memory access. The stride, step, or interval is an amount by which a current address (starting from address 304) is changed (increased or decreased) to compute a next address at which data of size 306 is to be accessed. For example, given a stride of 32 bytes (which is, in some embodiments, a full line), a memory access will proceed as follows: (1) access of data of size S (size 306) at base address BA (base address 304); (2) access of data of size S at BA+32 bytes; (3) access of data of size S at address BA+64 bytes; etc. In some embodiments, any size of stride can be used, as long as of one or more memory access rules are not violated.

Counter 310 in multi-line memory access instruction 300 is an indication of a number of strides to be used when performing the memory access. The counter is a value or a representation of a non-zero number of strides, e.g., 1, 10, etc. For example, if the value is 3, the above-described 32 byte stride would be performed three times, for addresses at BA, BA+32, BA+64, and BA+96 (and thus corresponding size S of memory would be accessed at each address starting from base address BA, as described above).

Flag 312 in multi-line memory access instruction 300 is an indication of whether or not write-chaining is engaged (or not) for the memory access. As described elsewhere herein, flag 312 is used in tandem with write combining buffer 230 to enable multiple multi-line memory access instruction's worth of data to be buffered in write combining buffer 230 prior to writing data from write combining buffer 230 out to memory. In some embodiments, flag 312 is only present in multi-line memory write instructions, i.e., in instructions that may buffer data in write combining buffer 230.

With regard to multi-line memory access instruction 400 as shown in FIG. 4, the opcode 402, address (ADDR) 404, size 406, and flag 412 fields/information function similarly to the similarly-named fields/information in multi-line memory access instruction 300. Those descriptions are not repeated for brevity. Pointer list 408 and counter 410 function differently than what is shown in FIG. 3. Pointer list 408 is a list of absolute or relative address pointers that indicate locations in memory in which relative or absolute addresses are listed and counter 410 is a value or representation of the number of pointers to be found in pointer list 408. Used together, pointer list 408 and counter 410 enable an execution unit executing the multi-line memory access instruction 400 (and/or other entity) to compute addresses at which memory is to be accessed.

With regard to multi-line memory access instruction 500 as shown in FIG. 5, the opcode 502, address (ADDR) 504, size 506, and flag 512 fields/information function similarly to the similarly-named fields/information in multi-line memory access instruction 300. Those descriptions are not repeated for brevity. Pointers-to-pointers (PTRS TO PTRS) 508 and counter 510 function differently than what is shown in FIGS. 3-4. Pointers-to-pointers 508 is list of pointers to absolute or relative address pointers (i.e., is pointers to pointers) each of which indicate locations in memory in which relative or absolute addresses are listed and counter 510 is a value or representation of the number of pointers to be found in pointers-to-pointers 508. Used together, pointers-to-pointers 508 and counter 510 enable an execution unit executing the multi-line memory access instruction 500 (and/or other entity) to compute addresses at which memory is to be accessed.

Using Multi-Line Memory Access Instructions to Perform Memory Accesses

Figure 6:
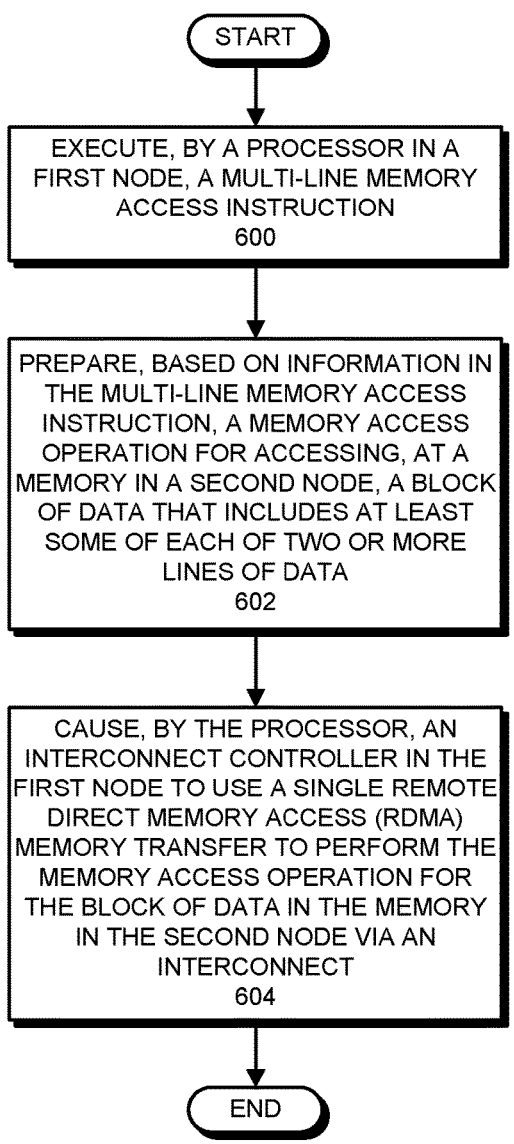
FIG. 6 presents a flowchart illustrating a process for accessing data in a remote memory based on executing a multi-line memory access instruction in accordance with some embodiments.

In the described embodiments, a processor (e.g., processor 104) in a system, based on executing multi-line memory access instructions, accesses data in memory (i.e., reads/loads or writes/stores the data in the memory). FIG. 6 presents a flowchart illustrating a process for accessing data in a remote memory based on executing a multi-line memory access instruction in accordance with some embodiments. Note that the operations shown in FIG. 6 are presented as a general example of operations performed by some embodiments. The operations performed by other embodiments include different operations and/or operations that are performed in a different order. For the example in FIG. 6, a processor in a system having a similar internal arrangement to processor 104 is described as performing various operations. In some embodiments, however, a processor having a different internal arrangement performs the described operations.

For the example shown in FIG. 6, it is assumed that the multi-line memory access is directed to a remote memory, i.e., a memory in a node other than the node in which the processor that executes the multi-line memory access instruction is located. For this reason, a remote direct memory access (RDMA) is performed in step 604. An example in which the multi-line memory access is directed to a local memory, i.e., a memory in the same node as processor that executes the multi-line memory access instruction, is presented in FIG. 10. In addition, for the example shown in FIG. 6, it is assumed that the multi-line memory access instruction has a similar format to the multi-line memory access instruction shown in FIG. 3, although some embodiments perform similar operations using other formats of multi-line memory access instruction (including the multi-line memory access instructions shown in FIGS. 4-5).

The operations in FIG. 6 start when a processor in a first node (e.g., one of the nodes 102 in system 100) executes a multi-line memory access instruction (step 600). During this operation, an execution unit (e.g., integer execution unit 222) in an execution subsystem of the processor, upon receiving the multi-line memory access instruction (or corresponding micro-operations) from a dispatcher in front end subsystem, executes the multi-line memory access instruction.

Executing the multi-line memory access instruction causes the execution unit to prepare, based on information in the multi-line memory access instruction, a memory access operation for accessing, at a memory in a second node (e.g., another/different one of the nodes 102 in system 100), a block of data that includes at least some of each of two or more lines of data (step 602). Generally, during this operation, the execution unit and/or other functional blocks in the processor triggered by the execution unit determine, for the block of data, and based on the information in the multi-line memory access instruction, a size of data (in terms of bits, bytes, portions of lines, etc.) to be accessed and a set of addresses at which data of the size of data is to be accessed. A number of examples of preparing a memory access operation are presented below with respect to FIGS. 7-9 in which the multi-line memory access instructions are specifically designated as multi-line memory read instructions or multi-line memory write instructions.

In some embodiments, the "information in the multi-line memory access instruction" that is used in preparing the memory access operation is the information shown in multi-line memory access instruction 300. In other words, the information includes some or all of address 304, size 306, stride 308, and counter 310. As described above, these fields/pieces of information from multi-line memory access instruction 300 are used to compute the particular addresses to be accessed and the size of data to be accessed at each address.

The execution unit in the processor then causes an interconnect controller in the first node (e.g., interconnect controller 108) to use a single RDMA memory transfer to perform the memory access operation for the block of data in the memory in the second node via an interconnect (step 604). During this operation, the interconnect controller performs operation to set up, depending on the particular multi-line memory access instruction, an RDMA read or RDMA write to perform a corresponding access of the block of data. The RDMA memory transfer accesses the block of data as computed in step 602, i.e., accesses the memory of the size specified in the multi-line memory access at the addresses computed in step 602. For example, if the multi-line memory access indicates that the memory access is to a consecutive set of five lines (e.g., five 32 byte portions of memory at consecutive addresses, i.e., a stride of 32 bytes or one line, a size of 32 bytes, and a count of 5) the RDMA memory transfer can include an indication that an access of the lines at the specified addresses in memory is to be performed.

Preparing and Performing a Multi-Line Memory Read or Memory Write

Figure 7:
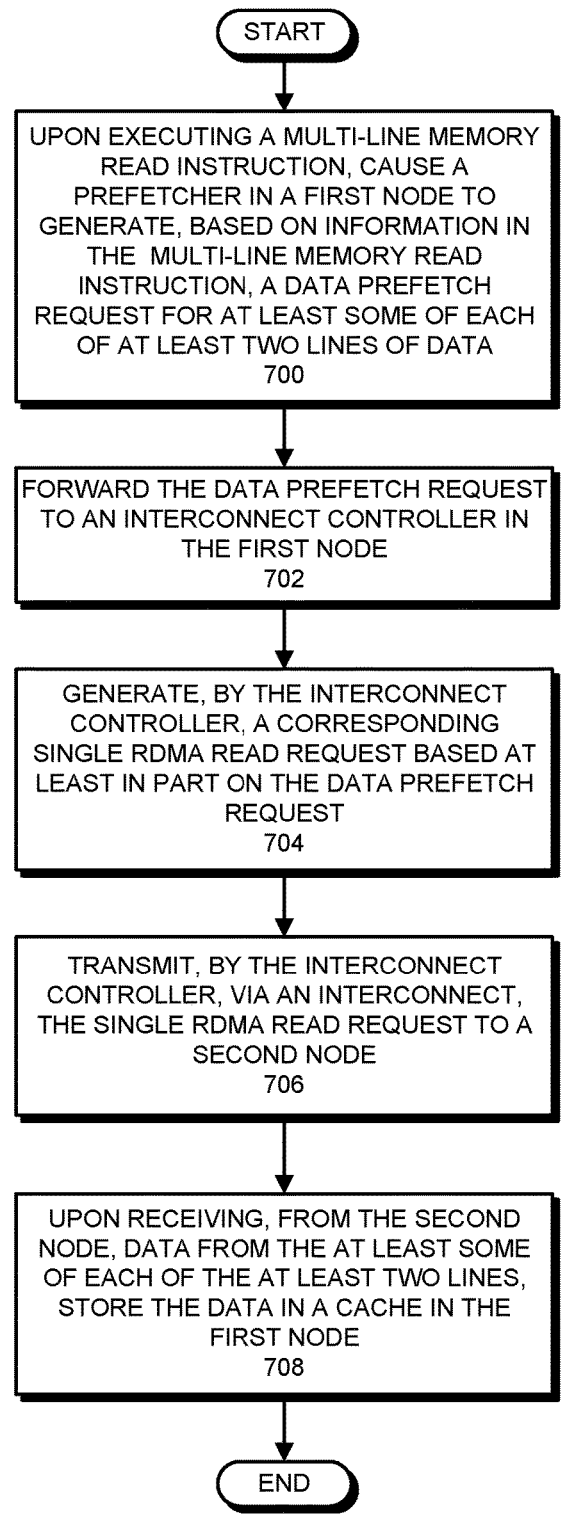
FIG. 7 presents a flowchart illustrating operations for preparing and performing a memory read operation based on executing a multi-line memory read instruction in accordance with some embodiments.
Figure 8:
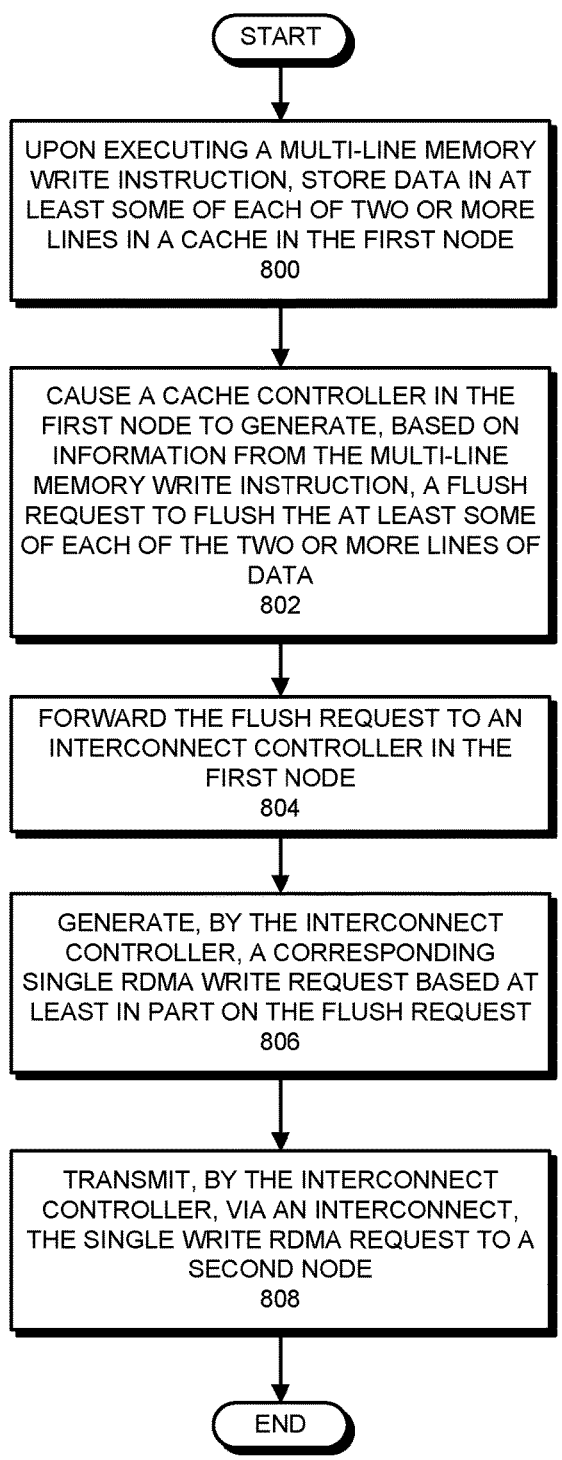
FIG. 8 presents a flowchart illustrating operations for preparing and performing a memory write operation based on executing a multi-line memory write instruction in accordance with some embodiments.
Figure 9:
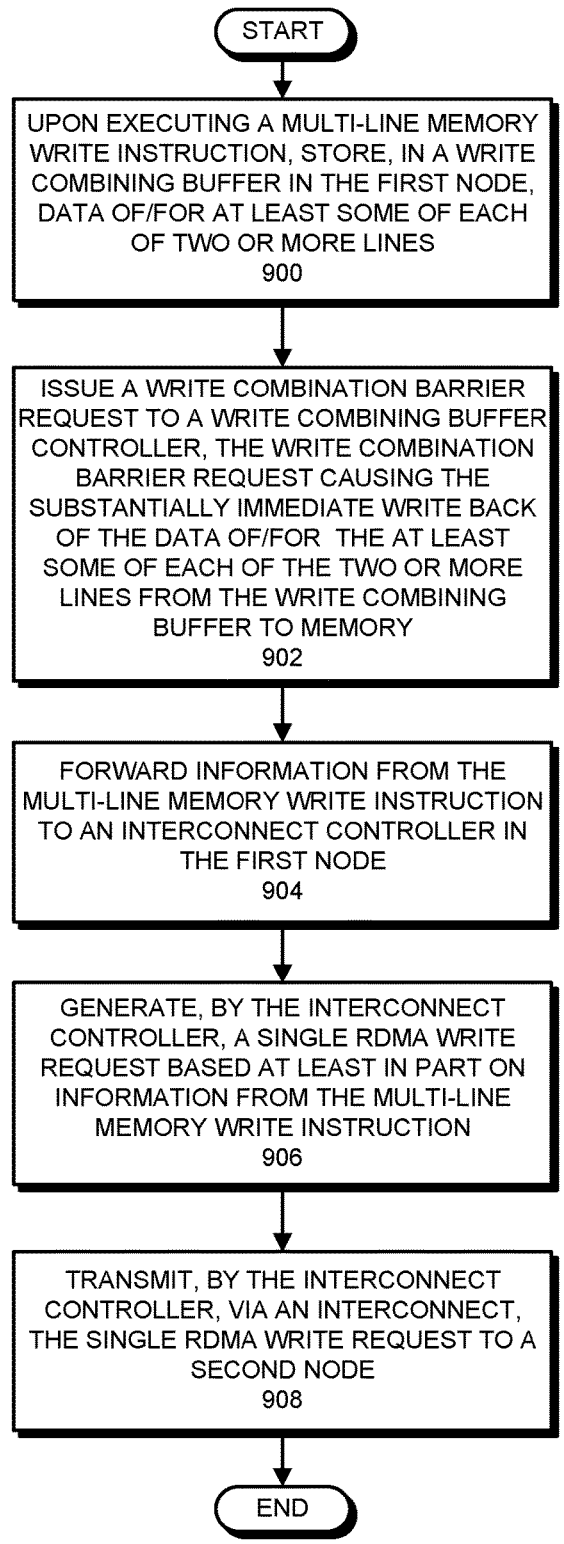
FIG. 9 presents a flowchart illustrating operations for preparing and performing a memory write operation upon executing a multi-line memory write instruction in accordance with some embodiments.

As shown in FIG. 6, the described embodiments perform, upon executing multi-line memory access instructions, corresponding memory accesses. Although a general case of memory "accesses" is presented in FIG. 6 in order to describe various operations in broad terms, in some embodiments, the described memory accesses are either memory reads or memory writes. FIGS. 7-9 present flowcharts in which the operations of steps 602-604 of FIG. 6 are illustrated in more detail for specific types of memory access operations. More specifically, in FIGS. 7-9, the operations in steps 602-604 are described with respect to executing multi-line memory read instructions (FIG. 7) and multi-line memory write instructions (FIGS. 8-9).

A multi-line memory read instruction is generally an instruction that causes a processor in a node to read, acquire, retrieve, etc. data from at least some of each of at least two lines of data in a memory (e.g., a local memory in the node or in a remote memory in another node) and load, store, cache, etc. the data in a cache in the processor and/or in a local memory in the node. Because the data is read from the at least some of each of the at least two lines of data, the data is loaded, stored, cached, similarly in the local memory and/or the cache in the processor—i.e., is stored in at least some of each of at least two lines of data, such as in corresponding portions of the local memory or in each of at least two lines in the cache. A multi-line memory write instruction is generally an instruction that causes a processor in a node to transmit, send, forward, etc., data for at least some of each of at least two lines of data to a memory (e.g., a local memory in the node or in a remote memory in another node) so that the data can be written, stored, etc. in the memory. Because the data includes data for the at least some of each of the at least two lines of data, the data is written, stored, etc. similarly in the memory—i.e., is stored in at least some of each of at least two lines of data, such as in corresponding portions of the memory, etc.

For the examples in FIGS. 7-9, a memory access (i.e., memory read or memory write) is performed in a remote memory—and thus using an RDMA request. Embodiments that perform memory accesses in local memories, i.e., in memories in same nodes as the processors that execute the multi-line memory access instructions, perform similar options, although the memory accesses are not RDMA operations, but instead are memory reads and memory writes of the local memory that are performed by a memory controller via a memory bus. For example, a burst read or write memory transfer operation may be performed by the memory controller to read the data from or write the data to the local memory.

FIG. 7 presents a flowchart illustrating operations for preparing and performing a memory read operation based on executing a multi-line memory read instruction in accordance with some embodiments. Note that the operations shown in FIG. 7 are presented as a general example of operations performed by some embodiments. The operations performed by other embodiments include different operations and/or operations that are performed in a different order. For the example in FIG. 7, a processor in a system having a similar internal arrangement to processor 104 is described as performing various operations. In some embodiments, however, a processor having a different internal arrangement performs the described operations.

For the example in FIG. 7, the multi-line memory read instruction is assumed to be of a similar format to the format shown in FIG. 3, although other embodiments may perform similar operations for different formats of multi-line memory read instructions.

The operations shown in FIG. 7 start when an execution unit in a processor in a first node, upon executing a multi-line memory read instruction, causes a data prefetcher in the first node (e.g., prefetcher 232) to generate, based on information in the multi-line memory read instruction, a data prefetch request for at least some of each of two or more lines of data (step 700). For this operation, the data prefetcher, based on information from the multi-line memory read instruction, generates a single multi-line data prefetch request for the data in the at least some of each of the two or more lines. In some embodiments, the multi-line data prefetch request includes addresses or values based thereon for the two or more lines and sizes for data to be prefetched that are determined based at least in part on the base address, stride, count, and size from the multi-line memory read instruction. For example, the prefetcher may compute the addresses for the multi-line data prefetch request using count number of strides from the base address and determine the size based on the indicated size.

The prefetcher then forwards the data prefetch request to an interconnect controller (step 702). During this operation, the multi-line data prefetch request or one or more commands based thereon is/are communicated to the interconnect controller (e.g. interconnect controller 108). For example, in some embodiments, this operation involves processing corresponding instructions in the front end subsystem and/or the execution subsystem to cause a load/store unit in the processor to signal the multi-line data prefetch request or the multi-line memory read instruction to the interconnect controller. As another example, the prefetcher communicates the data prefetch request directly to the interconnect controller via a communication mechanism (e.g., signal bus, processor flag memory location/register, etc.). As another example, in some embodiments, the prefetcher communicates the prefetch request to a memory controller that subsequently forwards one or more memory read commands to the interconnect controller.

The interconnect controller next generates a corresponding single RDMA read request based at least in part on the data prefetch request (step 704). For this operation, the interconnect controller generates an RDMA request packet that requests that the memory in the second node return the data in the at least some of each of the two or more lines in a single memory transfer (i.e., in the payload, if possible, of a single memory transfer packet). The RDMA request packet includes a header, a payload, etc. that are arranged within the RDMA request packet in accordance with a protocol in use on the interconnect—and cause the memory in the second node to return the requested data. In some embodiments, the interconnect controller uses information from the data prefetch request, the multi-line memory read instruction, and/or other sources for determining information (i.e., memory addresses, data sizes, etc.) to be included in the one or more request packets.

The interconnect controller then transmits, via an interconnect between the first node and second node (e.g., interconnect 110), the single RDMA read request to the second node (step 706). Upon receiving, from the second node, the data from the at least some of each of the two or more lines in response to the RDMA read request, the interconnect controller and/or other functional blocks in the processor store the data in a cache in the first node (step 708). During this operation, the data is stored in at least some of each of two or more corresponding lines (e.g., cache lines) in the cache.

FIG. 8 presents a flowchart illustrating operations for preparing and performing a memory write operation based on executing a multi-line memory write instruction in accordance with some embodiments. Note that the operations shown in FIG. 8 are presented as a general example of operations performed by some embodiments. The operations performed by other embodiments include different operations and/or operations that are performed in a different order. For the example in FIG. 8, a processor in a system having a similar internal arrangement to processor 104 is described as performing various operations. In some embodiments, however, a processor having a different internal arrangement performs the described operations.

For the example in FIG. 8, the portions of the memory (e.g., pages of memory, etc.) that are to be written to are assumed to be in a cacheable state, and thus data is first stored in a cache before being written out to memory. This contrasts with the write combining state of portions of the memory described below for FIG. 9. In addition, the multi-line memory write instruction is assumed to be of a similar format to the format shown in FIG. 3, although other embodiments may perform similar operations for different formats of multi-line memory write instructions.

The operations shown in FIG. 8 start when an execution unit in a processor in a first node (or another functional block), upon executing a multi-line memory write instruction, stores data in at least some of each of two or more lines of a cache in the first node (step 800). For this operation, data generated during computational operations, control operations, etc. is stored in the two or more lines using typical mechanisms and operations.

The execution unit next causes a cache controller in the first node to generate, based on information from the multi-line memory write instruction, a flush request to flush the at least some of each of the two or more lines of data (step 802). For this operation, the cache controller, based on information from the multi-line memory write instruction, generates a flush request for the data in the at least some of each of the two or more lines. In some embodiments, the flush request includes addresses or values based thereon for the two or more lines and sizes for data to be flushed that are determined based at least in part on the base address, stride, count, and size from the multi-line memory write instruction. For example, the cache controller may compute the addresses for the flush request using count number of strides from the base address and determine the size based on the indicated size. The cache controller, based on the flush request, flushes the at least some of each of the two or more lines of data from the cache, i.e., evicts or otherwise removes the at least some of each of the two or more lines of data from the cache and forwards the data to the interconnect controller for subsequent handling.

The cache controller also forwards the flush request to an interconnect controller (step 804). During this operation, the flush request or one or more commands based thereon is/are communicated to the interconnect controller. For example, in some embodiments, this operation involves processing corresponding instructions in the front end subsystem and/or the execution subsystem to cause a load/store unit in the processor to signal the flush request and/or commands based thereon to the interconnect controller. As another example, the cache controller communicates the flush request directly to the interconnect controller via a communication mechanism (e.g., signal bus, processor flag memory location/register, etc.).

In some embodiments, the cache controller does not forward the flush request to the interconnect controller. Instead, the execution unit or another functional block signals to the interconnect controller that a multi-line memory write instruction was executed. In these embodiments, the interconnect controller performs the operations of steps 806-808 based on information from the multi-line memory write instruction (and not the flush request).

The interconnect controller next generates a corresponding single RDMA write request based at least in part on the flush request (step 806). For this operation, the interconnect controller generates an RDMA request packet that includes, in its payload, the data from the at least some of each of the two or more lines and requests that the memory in the second node receive and write/store the data from the payload. The RDMA request packet includes a header, a payload, etc. that are arranged within the RDMA request packet and includes information in accordance with a protocol in use on the interconnect—and causes the memory in the second node to store the data from the payload. In some embodiments, the interconnect controller uses information from the flush request, the multi-line memory write instruction, and/or other sources for determining information (i.e., memory addresses, data sizes, payload data, etc.) to be included in the RDMA request packet.

The interconnect controller then transmits, via an interconnect between the first node and second node (e.g., interconnect 110), the single RDMA write request to the second node (step 808). As described above, the RDMA write request causes the receiving interconnect controller in the second node to store the data from the at least some of each of the two or more lines in the payload of the RDMA write request in corresponding portions of the memory and/or lines in a cache in the second node.

FIG. 9 presents a flowchart illustrating operations for preparing and performing a memory write operation upon executing a multi-line memory write instruction in accordance with some embodiments. Note that the operations shown in FIG. 9 are presented as a general example of operations performed by some embodiments. The operations performed by other embodiments include different operations and/or operations that are performed in a different order. For the example in FIG. 9, a processor in a system having a similar internal arrangement to processor 104 is described as performing various operations. In some embodiments, however, a processor having a different internal arrangement performs the described operations.

For the example in FIG. 9, the portions of the memory (e.g., pages of memory, etc.) that are to be written to are assumed to be in a write combining state, and thus data is first buffered in a write combining buffer (WCB), if possible, before being written out to memory. This contrasts with the cacheable state of portions of the memory described above for FIG. 8. In addition, the multi-line memory write instruction is assumed to be of a similar format to the format shown in FIG. 3, although other embodiments may perform similar operations for different formats of multi-line memory write instructions.

The operations shown in FIG. 9 start when an execution unit in a processor in a first node (or another functional block), upon executing a multi-line memory write instruction, stores data of/for at least some of each of two or more lines in a write combining buffer (e.g., write combining buffer 230) in the first node (step 900). For this operation, data generated during computational operations, control operations, etc. is buffered in the write combining buffer using typical mechanisms and operations.

The execution unit next issues, to a write combining buffer controller, a write combination barrier request, the write combination barrier request causes the substantially immediate write back of the data of/for the at least some of each of the two or more lines from the write combining buffer to a memory in the second node (step 902). For this operation, the execution unit, based on information from the multi-line memory write instruction, generates the write combination barrier request for the data of/for the at least some of each of the two or more lines that is stored in the write combining buffer. In some embodiments, the write combination barrier request includes a specific indication that particular data is to be written back, although other embodiments simply write back all data in the write combining buffer. In some embodiments, the write combination barrier request includes addresses or values based thereon for the two or more lines and sizes for data to be written back that are determined based at least in part on the base address, stride, count, and size from the multi-line memory write instruction. For example, the execution unit may compute the addresses for the write combination barrier request using count number of strides from the base address and determine the size based on the indicated size. The write combining buffer controller, based on the write combination barrier request, writes back the data of/for the at least some of each of the two or more lines from the write combining buffer, i.e., removes the data of/for the at least some of each of the two or more lines from the write combining buffer and forwards the data to the interconnect controller for subsequent handling therein. "Writing back" the data from the write combining buffer involves forwarding the data from the write combining buffer to an interconnect controller to be handled as described below.

Note that "substantially immediately" as used herein with respect to the write back operation for the write combining buffer indicates that the write back occurs in a typical or normal amount of time after the write combining buffer receives the write combination barrier request, which can be a very short period of time. Because the write combination barrier serves to cause the write back of data then present in the write combining buffer, data received after the write combination barrier request may be delayed in or prevented from being stored in the write combining buffer and/or not included in the write back. Thus, the data of/for the at least some of each of the two or more lines that is stored in the write combining buffer is written back quickly and with priority over specified other operations.

The execution unit also forwards information from the multi-line memory write instruction to an interconnect controller (step 904). During this operation, the execution unit or another functional block signals to the interconnect controller that a multi-line memory write instruction was executed and communicates information from the multi-line memory write instruction to the interconnect controller.

The interconnect controller next generates a corresponding single RDMA write request based at least in part on information from the multi-line memory write instruction (step 906). For this operation, the interconnect controller generates an RDMA request packet that includes, in its payload, the data from the write combining buffer (i.e., the data of/for the at least some of each of the two or more lines) and requests that the memory in the second node receive and store the data from the payload. The RDMA request packet includes a header, a payload, etc. that are arranged within the RDMA request packet and include information in accordance with a protocol in use on the interconnect—and cause the memory in the second node to store the data from the payload. In some embodiments, the interconnect controller uses information from the multi-line memory write instruction and/or other sources for determining information (i.e., memory addresses, data sizes, payload data, etc.) to be included in the RDMA request packet.

The interconnect controller then transmits, via an interconnect between the first node and second node (e.g., interconnect 110), the single RDMA write request to the second node (step 908). As described above, the RDMA write request causes the receiving interconnect controller in the second node to store the data from the at least some of each of the two or more lines in the payload of the RDMA write request in corresponding portions of the memory and/or lines in a cache in the second node.

Figure 10:
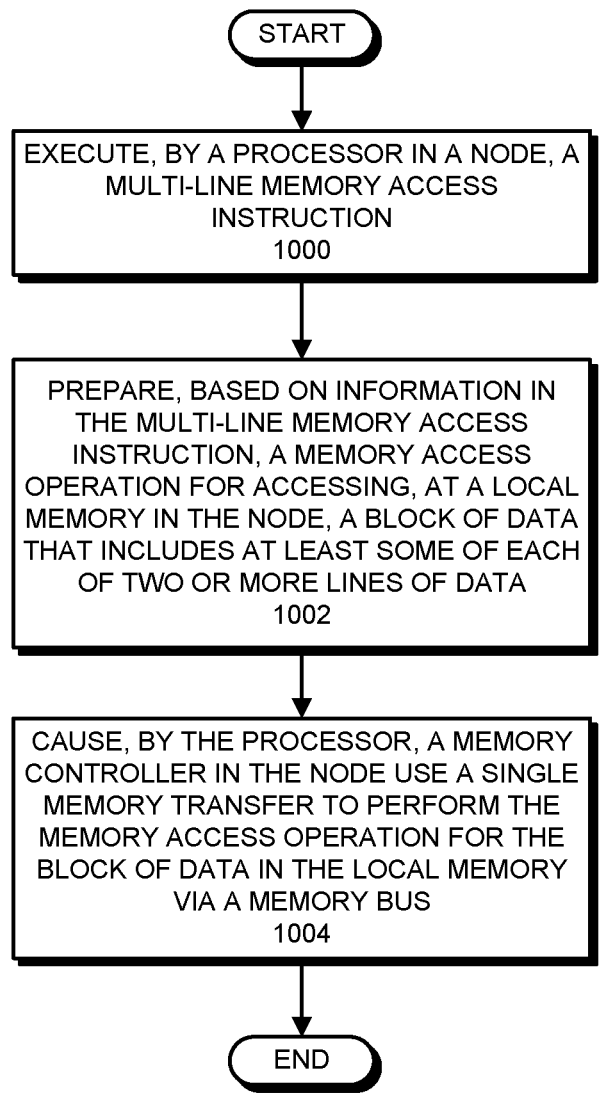
FIG. 10 presents a flowchart illustrating a process for accessing data in a local memory based on executing a multi-line memory access instruction in accordance with some embodiments.

FIG. 10 presents a flowchart illustrating a process for accessing data in a local memory based on executing a multi-line memory access instruction in accordance with some embodiments. Note that the operations shown in FIG. 10 are presented as a general example of operations performed by some embodiments. The operations performed by other embodiments include different operations and/or operations that are performed in a different order. For the example in FIG. 10, a processor in a system having a similar internal arrangement to processor 104 is described as performing various operations. In some embodiments, however, a processor having a different internal arrangement performs the described operations.

The operations in FIG. 10 start when a processor in a node (e.g., one of the nodes 102 in system 100) executes a multi-line memory access instruction (step 1000). During this operation, an execution unit (e.g., integer execution unit 222) in an execution subsystem of the processor, upon receiving the multi-line memory access instruction (or corresponding micro-operations) from a dispatcher in front end subsystem, executes the multi-line memory access instruction.

Executing the multi-line memory access instruction causes the execution unit to prepare, based on information in the multi-line memory access instruction, a memory access operation for accessing, at a local memory in the node, a block of data that includes at least some of each of two or more lines of data (step 1002). Generally, during this operation, the execution unit and/or other functional blocks in the processor that are triggered by the execution unit determine, for the block of data, and based on the information in the multi-line memory access instruction, a size of data (in terms of bits, bytes, portions of lines, etc.) to be accessed and a set of addresses at which data of the size of data is to be accessed. As described above, the multi-line memory access instruction can be a multi-line memory read instruction of a multi-line memory write instruction, and corresponding operations are performed for each type of access.

In some embodiments, the "information in the multi-line memory access instruction" that is used in preparing the memory access operation is the information shown in multi-line memory access instruction 300. In other words, the information includes some or all of address 304, size 306, stride 308, and counter 310. As described above, these fields/information from multi-line memory access instruction 300 are used to compute the particular addresses to be accessed and the size of data to be accessed at each address.

The execution unit in the processor then causes a memory controller in the node to use a single memory transfer to perform the memory access operation for the block of data in the local memory via a memory bus (step 1004). During this operation, the memory controller performs operations to set up, depending on the particular multi-line memory access instruction, a memory read or write to perform a corresponding access of the block of data. The memory transfer accesses the block of data as computed in step 1002, i.e., accesses the memory of the size specified in the multi-line memory access at the addresses computed in step 1002. For example, if the multi-line memory access indicates that the memory access is to a consecutive set of five lines (e.g., five 32 byte portions of memory at consecutive addresses, i.e., a stride of 32 bytes or one line, a size of 32 bytes, and a count of 5) the memory transfer can include an indication that an access of the lines at the specified addresses in memory is to be performed in a single memory transfer (e.g., in a burst read or write, etc.).

Preparing and Performing a Multi-Line Memory Write Using Write-Chaining Flags

Figure 11:
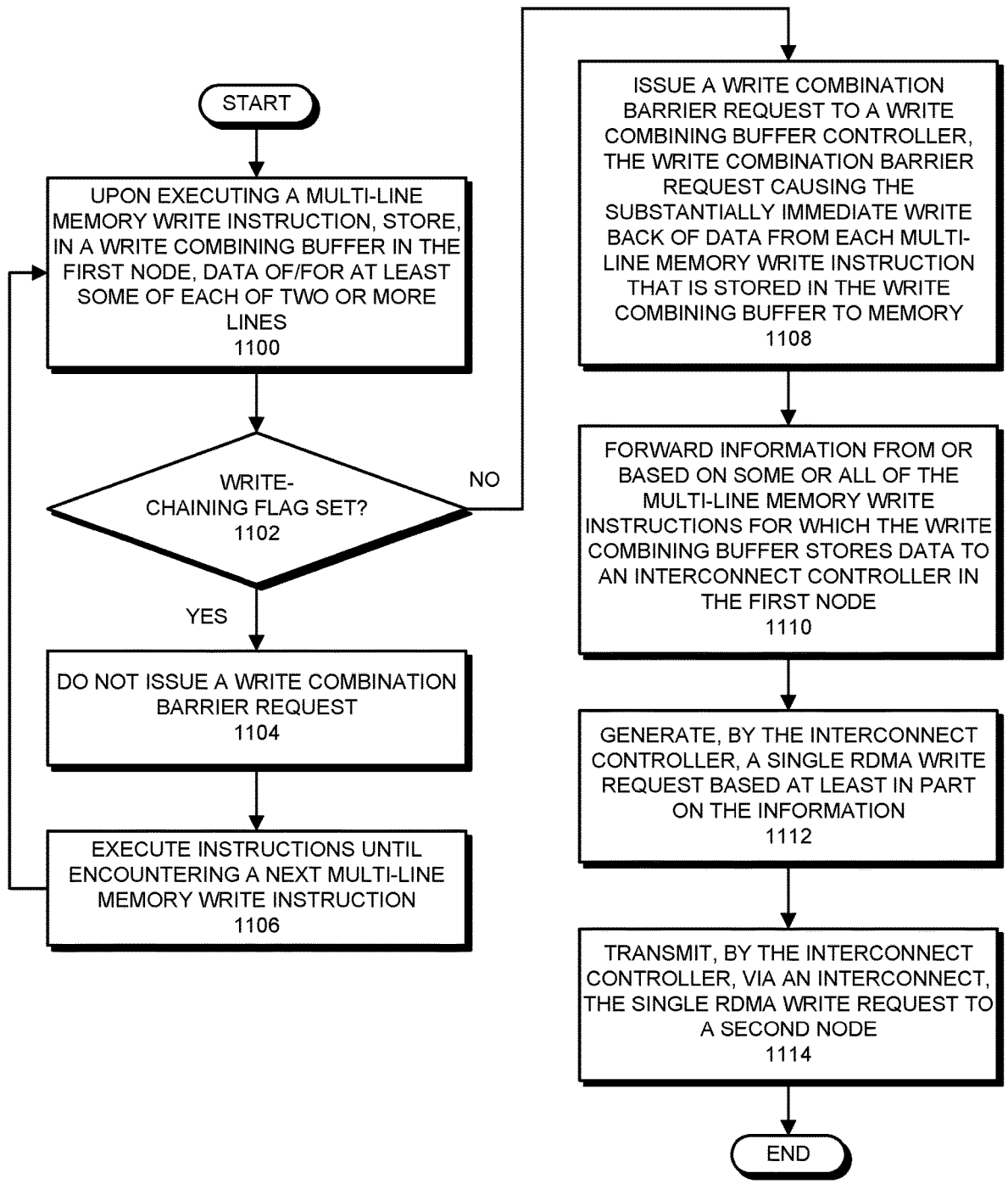
FIG. 11 presents a flowchart illustrating operations for preparing and performing a memory write operation upon executing multi-line memory write instructions having write-chaining flags in accordance with some embodiments.

In some embodiments, write-chaining flags in multi-line memory write instructions (e.g., flags 312, 412, and/or 512) are used to cause a processor to perform operations for buffering some or all of two or more lines of data for one or more multi-line memory access instructions in a write combining buffer before later writing back the some or all of the two or more lines of data upon executing a subsequent multi-line memory access instruction. FIG. 11 presents a flowchart illustrating operations for preparing and performing a memory write operation upon executing multi-line memory write instructions having (set or not set/cleared) write-chaining flags in accordance with some embodiments. Note that the operations shown in FIG. 11 are presented as a general example of operations performed by some embodiments. The operations performed by other embodiments include different operations and/or operations that are performed in a different order. For the example in FIG. 11, a processor in a system having a similar internal arrangement to processor 104 is described as performing various operations. In some embodiments, however, a processor having a different internal arrangement performs the described operations.

FIG. 11 presents a flowchart in which the operations of steps 602-604 of FIG. 6 are illustrated in more detail for a memory write operation. More specifically, in FIG. 11, the operations in steps 602-604 are described with respect to executing a multi-line memory write instruction with a write-chaining flag set or unset. For the example in FIG. 11, the portions of the memory (e.g., pages of memory, etc.) that are to be written to are assumed to be in a write combining state, and thus data is first buffered in a write combining buffer, if possible, before being written out to memory. In addition, the multi-line memory write instruction is assumed to be of a similar format to the format shown in FIG. 3, although other embodiments may perform similar operations for different formats of multi-line memory write instructions.

For the example in FIG. 11, a memory write is performed in a remote memory—and thus using an RDMA request. Embodiments that perform memory writes in local memories, i.e., in memories in same nodes as the processors that execute multi-line memory write instructions, perform similar options, although the memory writes are not RDMA operations, but instead are memory writes of the local memory that are performed by a memory controller via a memory bus.

The operations shown in FIG. 11 start when an execution unit in a processor in a first node (or another functional block), upon executing a multi-line memory write instruction, stores data of/for at least some of each of two or more lines in a write combining buffer (e.g., write combining buffer 230) in the first node (step 1100). For this operation, data generated during computational operations, control operations, etc. is buffered in the write combining buffer using typical mechanisms and operations.

The execution unit then checks a write-combining flag in (or otherwise associated with) the multi-line memory write instruction to determine if the write-chaining flag is set (step 1102). Recall that, in some embodiments, the write-chaining flag is used to indicate, to the execution unit and/or a write combining buffer controller, whether a write combination barrier should be sent or the at least some of each of the at least two lines should be buffered along with any existing data from other/earlier multi-line memory write instructions in write combining buffer 230. In these embodiments, as long as the write-chaining flag is set in multi-line memory write instructions, corresponding data is buffered in write combining buffer 230 and no write combination barrier is issued (so the data is not substantially immediately written back to memory due to executing a multi-line memory write instruction). When the write-chaining flag is not set in a multi-line memory write instruction, however, the write combination barrier is issued and the data (i.e., at least the data in write combining buffer 230 from any multi-line memory write instructions) is written back to memory. When the write-combining flag is set (step 1102), therefore, the processor does not issue a write combination barrier request (step 1104), but instead continues executing instructions until encountering a next multi-line memory write instruction (step 1106). Upon executing the next multi-line memory write instruction, the processor returns to step 1100.

When the write-chaining flag is not set/is clear (step 1102), the execution unit issues, to a write combining buffer controller, a write combination barrier request, the write combination barrier request causing the substantially immediate write back of data from each multi-line memory write instruction that is stored in the write combining buffer to memory (step 1108). In some embodiments, this data includes all data from prior write-chained multi-line memory write instructions that is stored in the write combining buffer (i.e., from multi-line memory write instructions for which the write-chaining flag was set) and the at least some of each of the two or more lines from the current multi-line memory write instruction. In some embodiments, the write combination barrier request includes a specific indication that particular data is to be written back, although other embodiments simply write back all data in the write combining buffer. The write combining buffer controller, based on the write combination barrier request, writes back the data from the write combining buffer, i.e., removes the data from the write combining buffer and forwards the data to the interconnect controller for subsequent handling. "Writing back" the data from the write combining buffer involves forwarding the data from the write combining buffer to an interconnect controller to be handled as described below.

The execution unit and/or another functional block then forwards, to the interconnect controller, information from or based on some or all of the multi-line memory write instructions for which the write combining buffer holds data (step 1110). During this operation, the execution unit and/or another functional block signals to the interconnect controller that one or more multi-line memory write instructions were executed and communicates information from the one or more multi-line memory write instructions to the interconnect controller. For example, the execution unit, write combining buffer controller, and/or another functional block may store, in a processor register or another memory location, a record of the data (addresses or other identifiers) that was previously buffered in the write combining buffer (in steps 1102-1106) when corresponding write-chaining flags were set in respective multi-line memory read instructions. This record and information from or based on the current multi-line memory write instruction may all be communicated to the interconnect controller in step 1110. As another example, in some embodiments, the execution unit, write combining buffer controller, and/or another functional block may simply signal the interconnect controller information indicating that a write back of all data from the write combining buffer is to occur.

The interconnect controller next generates a corresponding single RDMA write request based at least in part on the information (step 1112). For this operation, the interconnect controller generates an RDMA request packet that includes, in its payload, the data from the write combining buffer (i.e., the data of/for the at least some of each of the two or more lines and data from prior multi-line memory write instructions for which the write-chaining flag was set) and requests that the memory in the second node receive and store the data from the payload. The RDMA request packet includes a header, a payload, etc. that are arranged within the RDMA request packet and include information in accordance with a protocol in use on the interconnect—and cause the memory in the second node to store the data from the payload. In some embodiments, the interconnect controller uses information from the one or more multi-line memory write instructions for which data is buffered in the write combining buffer and/or other sources for determining information (i.e., memory addresses, data sizes, payload data, etc.) to be included in the RDMA request packet.

The interconnect controller then transmits, via an interconnect between the first node and second node (e.g., interconnect 110), the single RDMA write request to the second node (step 1114). As described above, the RDMA write request causes the receiving interconnect controller in the second node to store data from the payload of the RDMA write request in corresponding portions of the memory and/or lines in a cache in the second node.

Virtual Memory and Multi-Line Memory Access Instructions

In some embodiments, virtual memory is used by processors, nodes, and/or the system (e.g., system 100). In these embodiments, a multi-line memory access instruction that accesses memory on multiple pages can cause multiple virtual address to physical address translations to be performed. In order to avoid delays and other complications of multiple virtual address to physical address translations (e.g., multiple page table walks, etc.), some embodiments limit the number of pages that are permitted to be accessed by a multi-line memory access instruction. For example, in some embodiments, all addresses accessed by the same multi-line memory access instruction are to be included in less than a threshold number of pages (e.g., one page, two pages, etc.).

Operations Relating to Memory Accesses

In some embodiments, the interconnect controller and/or the memory controller perform operations for improving the arrangement of addresses accessed during a multi-line memory access instruction, configuring memory accesses, selecting data to be included in a multi-line memory access instructions, etc. For example, these operations may include grouping physically adjacent lines into the same multi-line memory access instructions/memory transfers (in terms of physical locations of lines in a memory), so that accesses are performed in fewer sub-operations. Using segmented cache dirty bits (for corresponding lines in the cache) for controlling byte enable flags—when only a portion of a line is to be read or written during an access. Using, within memory access requests (packets, messages, etc.) offset-based addressing to compress addresses, when such addressing is supported by the underlying protocol.

In some embodiments, a system (e.g., processor 104 and/or some portion thereof) uses code and/or data stored on a non-transitory computer-readable storage medium to perform some or all of the operations herein described. More specifically, the system reads the code and/or data from the computer-readable storage medium and executes the code and/or uses the data when performing the described operations. A computer-readable storage medium can be any device, medium, or combination thereof that stores code and/or data for use by a system. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules perform the operations herein described. For example, the hardware modules can include, but are not limited to, one or more processors/cores/central processing units (CPUs), application-specific integrated circuit (ASIC) chips, field-programmable gate arrays (FPGAs), compute units, embedded processors, graphics processors (GPUs)/graphics cores, pipelines, Accelerated Processing Units (APUs), functional blocks, system management units, power controllers, and/or other programmable-logic devices. When such hardware modules are activated, the hardware modules perform some or all of the operations. In some embodiments, the hardware modules include one or more general purpose circuits that are configured by executing instructions (program code, firmware, etc.) to perform the operations.

In some embodiments, a data structure representative of some or all of the structures and mechanisms described herein (e.g., processor 104, memory 106, and/or some portion thereof) is stored on a non-transitory computer-readable storage medium that includes a database or other data structure which can be read by an electronic device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described structures and mechanisms. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N. As used herein, despite possibly using similar letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the system performs a first operation, a second operation, etc.," the system performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A system that performs memory access operations, the system comprising:
 a processor in a first node;
 a memory in a second node;
 a communication interconnect coupled to the processor and the memory; and
 an interconnect controller in the first node coupled between the processor and the communication interconnect;
 the processor configured to:
  upon executing a multi-line memory access instruction from among one or more multi-line memory access instructions in an instruction set for the processor, prepare a memory access operation for accessing, in the memory, a block of data comprising a portion of data from each of at least two lines of data, a size of the portion of data being dictated by the multi-line memory access instruction; and cause the interconnect controller to use a single remote direct memory access (RDMA) memory transfer to perform the memory access operation for the block of data with the memory in the second node via the communication interconnect.

2. The system of claim 1, further comprising:
a data prefetcher in the first node; and
a cache in the first node, wherein:
the memory access operation is a read operation during which the block of data is acquired from the memory in the second node and stored in the cache in the first node;
preparing the memory access operation includes:
causing the data prefetcher to generate, based on information from the multi-line memory access instruction, a data prefetch request for the at least some of each of the at least two lines of data; and
causing the interconnect controller to use the single RDMA memory transfer to perform the memory access operation includes:
forwarding the data prefetch request from the data prefetcher to the interconnect controller, wherein the interconnect controller generates a corresponding single RDMA request based at least in part on the data prefetch request.

3. The system of claim 2, wherein information in the multi-line memory access instruction comprises some or all of a base address, a stride, a count, and one or more pointers, and the data prefetcher uses addresses generated therefrom in generating the data prefetch request.

4. The system of claim 2, wherein:
the data prefetcher records, in a prefetch record, identifiers of prefetched lines of data, the prefetch record used by the data prefetcher for determining lines of data that are to be prefetched; and
the data prefetcher does not record, in the prefetch record, some or all prefetches from prefetch requests generated based on information from multi-line memory access instructions, thereby avoiding altering the prefetch record based on such prefetches.

5. The system of claim 1, further comprising:
a cache in the first node; and
a cache controller in the first node, wherein:
the memory access operation is a write operation during which the block of data is sent from the cache in the first node to be stored in the memory in the second node;
preparing the memory access operation includes:
storing, in the cache, the at least some of each of the at least two lines of data; and
causing the cache controller to generate, based on information from the multi-line memory access instruction, a flush request to flush the at least some of each of the at least two lines of data from the cache; and
causing the interconnect controller to use the single RDMA memory transfer to perform the memory access operation includes:
forwarding the flush request from the cache controller to the interconnect controller, wherein the interconnect controller generates a corresponding single RDMA request based at least in part on the flush request.

6. The system of claim 5, wherein information in the multi-line memory access instruction comprises some or all of a base address, a stride, a count, and one or more pointers, and the cache controller uses addresses generated therefrom in generating the flush request.

7. The system of claim 1, further comprising:
write combining buffer (WCB) in the first node; and
a WCB controller in the first node, wherein:
the memory access operation is a write operation during which the block of data is sent from the WCB in the first node to be stored in the memory in the second node;
preparing the memory access operation includes:
storing, in the WCB, the at least some of each of the at least two lines of data; and
issuing a write combination barrier request to the WCB controller, the write combination barrier request causing the substantially immediate write back of data in the WCB; and
causing the interconnect controller to use the single RDMA memory transfer to perform the memory access operation includes:
forwarding the information from the multi-line memory access instruction to the interconnect controller, wherein the interconnect controller generates a corresponding single RDMA request based at least in part on the information from the multi-line memory access instruction.

8. The system of claim 7, wherein information in the multi-line memory access instruction comprises some or all of a base address, a stride, a count, and one or more pointers, and the interconnect controller uses addresses generated therefrom in generating the single RDMA request.

9. The system of claim 1, wherein:
the memory access operation is a write operation during which the block of data is sent from the processor in the first node to be stored in the memory in the second node;
the multi-line memory access instruction includes a write-chaining flag;
the interconnect controller:
when the write-chaining flag is asserted, stores, in a WCB, lines of data indicated in the multi-line memory access instruction along with any existing lines of data in the WCB from prior multi-line memory access instructions for which the write-chaining flags were asserted; and
when the write-chaining flag is deasserted, uses the single RDMA memory transfer to perform the write operation for lines of data indicated in the multi-line memory access instruction and any existing lines of data in the WCB from prior multi-line memory access instructions.

10. The system of claim 1, further comprising:
a local memory in the first node;
a memory bus coupled to the processor and the local memory; and
a memory controller coupled between the processor and the memory bus;
the processor configured to:
upon executing an other multi-line memory access instruction, prepare an other memory access operation for accessing, in the local memory, an other block of data comprising at least some of each of at least two lines of data; and cause the memory controller to use a single memory transfer to perform the memory access operation for the other block of data via the memory bus.

11. The system of claim 1, wherein each line of data includes a number of bytes of data equal to a number of bytes that is included in a cache line.

12. The system of claim 1, wherein the communication interconnect uses a packet-based protocol for handling communications between the processor and the memory, the packet-based protocol supporting RDMA memory accesses.

13. The system of claim 1, wherein the multi-line memory access instruction dictates the size of the portion as a full line or a fraction of a line.

14. A method for performing memory access operations in a system that includes a processor in a first node, a memory in a second node, a communication interconnect coupled to the processor and the memory, and an interconnect controller in the first node coupled between the processor and the communication interconnect, the method comprising:

upon executing, by the processor, a multi-line memory access instruction from among one or more multi-line memory access instructions in an instruction set for the processor, preparing a memory access operation for accessing, in the memory, a block of data comprising a portion of data from each of at least two lines of data, a size of the portion of data being dictated by the multi-line memory access instruction; and causing, by the processor, the interconnect controller to use a single remote direct memory access (RDMA) memory transfer to perform the memory access operation for the block of data with the memory in the second node via the communication interconnect.

15. The method of claim 14, wherein:

the system includes a data prefetcher in the first node and a cache in the first node;

the memory access operation is a read operation during which the block of data is acquired from the memory in the second node and stored in the cache in the first node;

preparing the memory access operation includes:
    causing the data prefetcher to generate, based on information from the multi-line memory access instruction, a data prefetch request for the at least some of each of the at least two lines of data; and causing the interconnect controller to use the single RDMA memory transfer to perform the memory access operation includes:
    forwarding the data prefetch request from the data prefetcher to the interconnect controller, wherein the interconnect controller generates a corresponding single RDMA request based at least in part on the data prefetch request.

16. The method of claim 15, wherein information in the multi-line memory access instruction comprises some or all of a base address, a stride, a count, and one or more pointers, and the data prefetcher uses addresses generated therefrom in generating the data prefetch request.

17. The method of claim 14, wherein:

the system includes a cache and a cache controller in the first node;

the memory access operation is a write operation during which the block of data is sent from the cache in the first node to be stored in the memory in the second node;

preparing the memory access operation includes:
    storing, in the cache, the at least some of each of the at least two lines of data; and
    causing the cache controller to generate, based on information from the multi-line memory access instruction, a flush request to flush the at least some of each of the at least two lines of data from the cache; and causing the interconnect controller to use the single RDMA memory transfer to perform the memory access operation includes:
    forwarding the flush request from the cache controller to the interconnect controller, wherein the interconnect controller generates a corresponding single RDMA request based at least in part on the flush request.

18. The method of claim 17, wherein information in the multi-line memory access instruction comprises some or all of a base address, a stride, a count, and one or more pointers, and the cache controller uses addresses generated therefrom in generating the flush request.

19. The method of claim 14, wherein:

the system includes write combining buffer (WCB) and a WCB controller in the first node;

the memory access operation is a write operation during which the block of data is sent from the WCB in the first node to be stored in the memory in the second node;

preparing the memory access operation includes:
    storing, in the WCB, the at least some of each of the at least two lines of data; and
    issuing a write combination barrier request to the WCB controller, the write combination barrier request causing the substantially immediate write back of data in the WCB; and causing the interconnect controller to use the single RDMA memory transfer to perform the memory access operation includes:
    forwarding the information from the multi-line memory access instruction to the interconnect controller, wherein the interconnect controller generates a corresponding single RDMA request based at least in part on the information from the multi-line memory access instruction.

20. The method of claim 19, wherein information in the multi-line memory access instruction comprises some or all of a base address, a stride, a count, and one or more pointers, and the interconnect controller uses addresses generated therefrom in generating the single RDMA request.

21. The method of claim 14, wherein:

the system includes a write combining buffer (WCB);

the memory access operation is a write operation during which the block of data is sent from the processor in the first node to be stored in the memory in the second node;

the multi-line memory access instruction includes a write-chaining flag; and the method further comprises:
    when the write-chaining flag is asserted, storing, in a WCB, lines of data indicated in the multi-line memory access instruction along with any existing lines of data in the WCB from prior multi-line memory access instructions for which the write-chaining flags were asserted; and
    when the write-chaining flag is deasserted, uses the single RDMA memory transfer to perform the write operation for lines of data indicated in the multi-line memory access instruction and any existing lines of data in the WCB from prior multi-line memory access instructions.

22. The method of claim 14, wherein:

the system includes a local memory in the first node, a memory bus coupled to the processor and the local memory, and a memory controller coupled between the processor and the memory bus;

the method further comprises:

upon executing an other multi-line memory access instruction, preparing an other memory access operation for accessing, in the local memory, an other block of data comprising at least some of each of at least two lines of data; and causing the memory controller to use a single memory transfer to perform the memory access operation for the other block of data via the memory bus.

23. The method of claim 14, wherein the multi-line memory access instruction dictates the size of the portion as a full line or a fraction of a line.

* * * * *